Dec. 3, 1963 J. C. KING 3,113,224

HIGH TEMPERATURE QUARTZ PIEZOELECTRIC DEVICES

Filed June 21, 1961

INVENTOR
J. C. KING
BY George S. Indig
ATTORNEY

United States Patent Office 3,113,224
Patented Dec. 3, 1963

3,113,224
HIGH TEMPERATURE QUARTZ PIEZOELECTRIC DEVICES

James C. King, Whippany, N.J., assignor to Bell Telephone Laboratories, Incorporated, New York, N.Y., a corporation of New York
Filed June 21, 1961, Ser. No. 118,692
8 Claims. (Cl. 310—9.5)

This invention relates to novel piezoelectric quartz transducers. More specifically, it concerns new forms of quartz crystals which are adapted for efficient operation at high temperatures.

Quartz crystals, both natural and synthetic, are well established for use in piezoelectric devices such as frequency standards, oscillators, filters, delay lines, microphones, etc.

Intense recent interest in the efficient and stable operation of these devices at elevated temperatures make too apparent the inability of ordinary quartz piezoelectric quartz crystals to efficiently perform at temperatures in excess of 250° C. Specifically, natural quartz has a room temperature absorption as little as $5.10^{-7}$ at 1 mc. However, at 500° C. the absorption at the same operating frequency is $10^{-3}$ rendering the crystal virtually useless.

It has now been found that quartz crystals which have been subjected to an electrolytic treatment, of a nature hereinafter fully described, essentially retain their electroacoustic efficiency to the $\alpha$-$\beta$ transition temperature, approximately 550° C. Specifically, the absorption value in typical crystals over the entire temperature range of 25° C. to 550° C. was found to remain virtually constant, varying only from $10^{-6}$ to $5.10^{-6}$.

As a consequence of high temperature operation a further and quite significant advantage is realized. The usual quartz resonators when exposed to optical saturation with ionizing radiation exhibit an average down shift in frequency of 20 p.p.m. for natural quartz and an upward shift of the same magnitude for synthetic quartz. Both of these undesirable deviations can be annealed out in a few minutes at elevated temperatures of the order of 350° C. according to known techniques. Consequently, a crystal according to this invention operating at an elevated temperature is effectively transparent to ionizing radiation such as X-rays or $\gamma$-rays. Furthermore, displacement damage in piezoelectric quartz crystals, caused by high energy radiation, such as fast neutron bombardment, is known to anneal at a reasonable rate at 800° C. An isochronal evaluation of the activation energy for this annealing mechanism indicates a finite annealing function at lower temperatures, for instance 500° C. Accordingly, operation of the piezoelectric quartz devices at elevated temperatures made possible by this invention results in a significant degree of annealing in many radiation environments. For instance, such crystals are capable of dependable and efficient operation in environments proximate to nuclear reactors or in satellite systems which traverse the Van Allen radiation belt.

With regard to the adaptation of high temperature resonators to precision frequency standards, at least two operating characteristics are measurably enhanced. Both the initial frequency stabilization rate and the drive, or elastic strain-frequency sensitivity, are dependent upon thermally activated mechanisms in the crystal lattice. Thus, the frequency aging rate at elevated temperatures is accelerated resulting in a shorter stabilization period. Also, the strain energy has a less pronounced effect on the elastic modulus of the medium. Similar advantages inhere in high temperature operation of other piezoelectric devices.

The electrolytic treatment which promotes the high temperature efficiency of natural and synthetic piezoelectric quartz crystals according to this invention involves subjecting the quartz to a high intensity field at an elevated temperature for a prescribed time period as will be hereinafter more fully described.

This invention may perhaps be more easily understood when considered in conjunction with the drawing in which.

Figure 1:
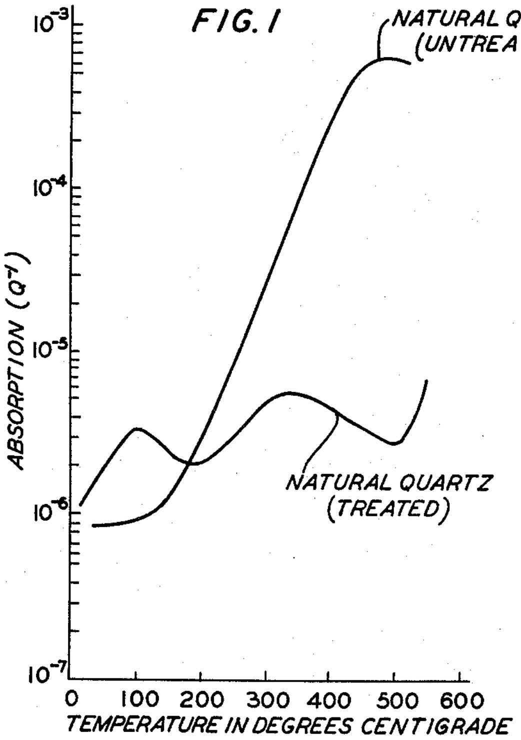
FIG. 1 is a plot of the absorption by internal friction (reciprocal of Q) in a natural quartz crystal vs. temperature in degrees centigrade at 5 mc. operating frequency illustrating the unexpected improvement in high temperature performance of natural quartz crystals treated in accordance with this invention.
Figure 2:
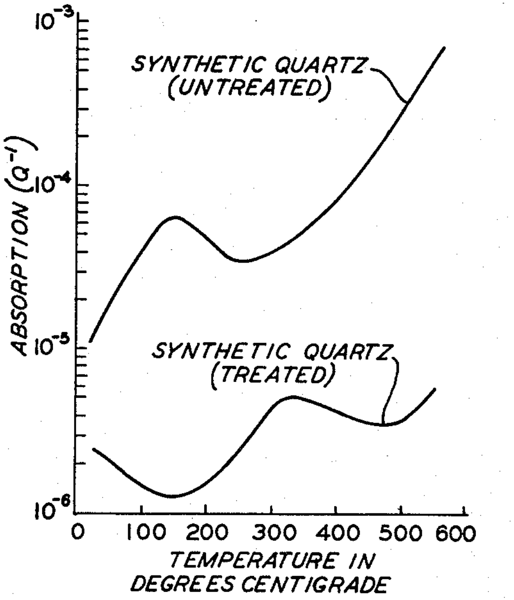
FIG. 2 is a plot similar to that of FIG. 1 illustrating the same effect in synthetic quartz crystals.

FIGS. 1 and 2 demonstrate the unexpected high temperature characteristics of natural and synthetic quartz when electrolytically treated. Each figure includes two curves designated "untreated" and "treated" respectively. These points were obtained at 5 mc., 5th overtone with plane-convex plates 1.50 cm. in diameter. The synthetic crystal of FIG. 2 was Z-growth. Both crystals were AT-cut.

As is seen the treated quartz in each instance exhibits far superior efficiency over the elevated temperature ranges particularly in excess of 300° C.

As is well established in the art, piezoelectric quartz crystals resonate most efficiently in characteristic modes under given conditions. Quartz crystals in current device applications utilize predominantly thickness shear mode vibration and are generally AT-cut. The AT-cut is a Y-cut rotated in a positive direction (ref. I.R.E. standard) about the X-axis. For any given operating temperature the crystal must be cut at a corresponding angle to provide a turn-over point or inflection point in the frequency vs. temperature relation. This turn-over point, as is well known in the art, is essential to provide a frequency stable area of operation over a small but controllable temperature range. Heretofore, the high temperature properties of quartz have not been thoroughly investigated due primarily to its high loss behavior. Specifically, prior investigations were restricted primarily to crystals having turn-over points of less than 250° C. thus avoiding the problem of excessive energy absorption at higher temperatures.

Figure 3:
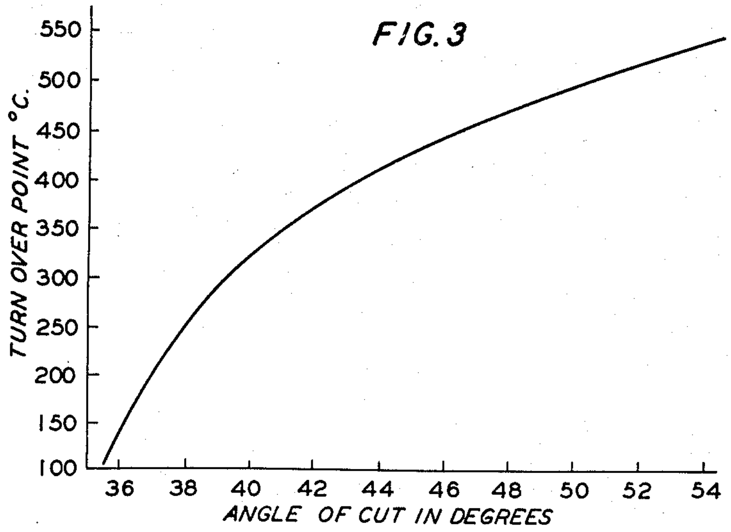
FIG. 3 is a plot of the turn-over point in degrees centigrade vs. the angle of cut of the quartz crystal correlating the appropriate operating temperature for a given AT crystal cut.

FIG. 3 shows the relation between the turn-over point and the crystal angle for the conventional AT-cut. This shows that at 250° C. the optimum angle is approximately 38°. It has been found in practice that for AT-cut quartz, a useful turn-over point coupled with high efficiency occurs at room temperature at an angle of 35°20.5′. Accordingly, prior art device design has generally adapted cut angles of this general magnitude.

Due to high loss at higher temperatures, corresponding to cut angles much in excess of this value, it is accepted in the art that cuts in excess of 38° are virtually useless. It is for operating temperatures in excess of 300° C. corresponding to crystal cuts of at least 39°25′ that this invention is primarily adapted. High temperature applications presently contemplated require temperatures in excess of 350° C. for which the cut angle is 40°50′. This is a preferred minimum cut angle for many uses.

According to a preferred embodiment of this invention, the electrolytic treatment which provides the efficient high temperature operation of both natural and synthetic quartz was carried out essentially as follows.

Gold electrodes were deposited on opposing faces of a quartz block approximately 2 cm. in cross section. The block was placed in a furnace with high voltage leads attached to the gold electrodes. The furnace was heated to 500° C. A field of 2.7 kilovolts/cm. was impressed across the block and the block was retained under these conditions for a period of 48 hours. Crystals were then cut from this block in a wafer shape with one plane and one convex surface having dimensions of 15 mm. in diameter and 1.5 mm. thick. Typical crystals treated in this manner and cut with prescribed angles exhibit turnover points which are tabulated in the following table.

*Table I*

| Example | Type | Cut | Angle | Turn-over Point, ° C. |
|---|---|---|---|---|
| 1 | synthetic | AT | 39°25′ | 300 |
| 2 | do | AT | 40°50′ | 350 |
| 3 | do | AT | 49° | 492 |
| 4 | do | AT | 50° | 505 |
| 5 | do | AT | 51° | 517 |
| 6 | do | AT | 52° | 528 |
| 7 | do | AT | 52° | 535 |
| 8 | natural (Brazilian) | AT | 53° | 535 |
| 9 | synthetic | BT | −13° | 300 |
| 10 | do | BT | −7°30′ | 450 |
| 11 | do | CT | 43° | 300 |
| 12 | do | DT | −53° | 300 |

Good high temperature response can be obtained according to this electrolytic treatment with temperatures in the range of 350° C.–550° C. and fields in the range of 500 volts/cm.–$10^6$ volts/cm. Low temperatures coupled with low field intensity require a longer treatment time. It has been found preferable to operate in the ranges 400° C.–520° C. at 1–3 kv. field intensity. For treatments according to these conditions durations of at least 12 hours are required.

Since for practical applications the art has adopted the AT cut for piezoelectric quartz crystals, primary attention has been directed to that cut. However, investigations show that the phenomenon on which this invention is based also occurs in other cuts, specifically the BT, CT and DT cuts corresponding to Examples 9, 10, 11 and 12. Accordingly, this invention encompasses all quartz piezoelectric crystals which have been electrolyzed with the prescribed conditions and can thus be utilized at temperatures in excess of 300° C. The appropriate manner of defining such crystals is those which exhibit a turnover point (i.e., inflection point) in their frequency vs. temperature characteristics in excess of 300° C.

Various other modifications and embodiments will become apparent to those skilled in the art. However, all such variations which basically rely on the teachings through which this invention has advanced the art are properly considered within the scope of this invention.

What is claimed is:

1. A piezoelectric device comprising a quartz crystal which has been subjected to an electric field of at least 500 volts/cm. at a temperature of at least 400° C. for a period of at least 12 hours, said crystal having an AT-cut angle of at least 39°25′ such that the piezoelectric frequency-temperature characteristic of said crystal exhibits an inflection point at a temperature of at least 300° C.

2. A piezoelectric device comprising a quartz crystal which has been subjected to an electric field of at least 500 volts/cm. at a temperature of at least 400° C. for a period of at least 12 hours, said crystal having a BT-cut angle of at least −13° such that the piezoelectric frequecy-temperature characteristic of said crystal exhibits an inflection point at a temperature of at least 300° C.

3. A piezoelectric device comprising a quartz crystal which has been subjected to an electric field of at least 500 volts/cm. at a temperature of at least 400° C. for a period of at least 12 hours, said crystal having a CT-cut angle of at least 43° such that the piezoelectric frequency-temperature characteristic of said crystal exhibits an inflection point at a temperature of at least 300° C.

4. A piezoelectric device comprising a quartz crystal which has been subjected to an electric field of at least 500 volts/cm. at a temperature of at least 400° C. for a period of at least 12 hours, said crystal having a DT-cut angle of at least −53° such that the piezoelectric frequency-temperature characteristic of said crystal exhibits an inflection point at a temperature of at least 300° C.

5. The process of manufacturing a quartz crystal body for use in a piezoelectric device adapted for operation at a temperature of at least 300° C. which comprises subjecting a quartz crystal to an electric field of at least 500 volts/cm. at a temperature of at least 400° C. for a period of at least 12 hours and cutting said crystal at an AT-cut angle of at least 39°25′ such that the piezoelectric frequency-temperature characteristic of said crystal exhibits an inflection point at a temperature of at least 300° C.

6. The process of manufacturing a quartz crystal body for use in a piezoelectric device adapted for operation at a temperature of at least 300° C. which comprises subjecting a quartz crystal to an electric field of at least 500 volts/cm. at a temperature of at least 400° C. for a period of at least 12 hours and cutting said crystal at a BT-cut angle of at least −13° such that the piezoelectric frequency-temperature characteristic of said crystal exhibits an inflection point at a temperature of at least 300° C.

7. The process of manufacturing a quartz crystal body for use in a piezoelectric device adapted for operation at a temperature of at least 300° C. which comprises subjecting a quartz crystal to an electric field of at least 500 volts/cm. at a temperature of at least 400° C. for a period of at least 12 hours and cutting said crystal at a CT-cut angle of at least 43° such that the piezoelectric frequency-temperature characteristic of said crystal exhibits an inflection point at a temperature of at least 300° C.

8. The process of manufacturing a quartz crystal body for use in a piezoelectric device adapted for operation at a temperature of at least 300° C. which comprises subjecting a quartz crystal to an electric field of at least 500 volts/cm. at a temperature of at least 400° C. for a period of at least 12 hours and cutting said crystal at a DT-cut angle of at least −53° such that the piezoelectric frequency-temperature characteristic of said crystal exhibits an inflection point at a temperature of at least 300° C.

References Cited in the file of this patent

UNITED STATES PATENTS

| | | |
|---|---|---|
| 1,848,893 | Lavallee | Mar. 8, 1932 |
| 2,268,823 | Herzog | May 3, 1940 |
| 2,656,473 | Warner | Oct. 20, 1953 |
| 2,702,427 | Roberts | Feb. 22, 1955 |
| 2,706,326 | Mason | Apr. 19, 1955 |